UNITED STATES PATENT OFFICE.

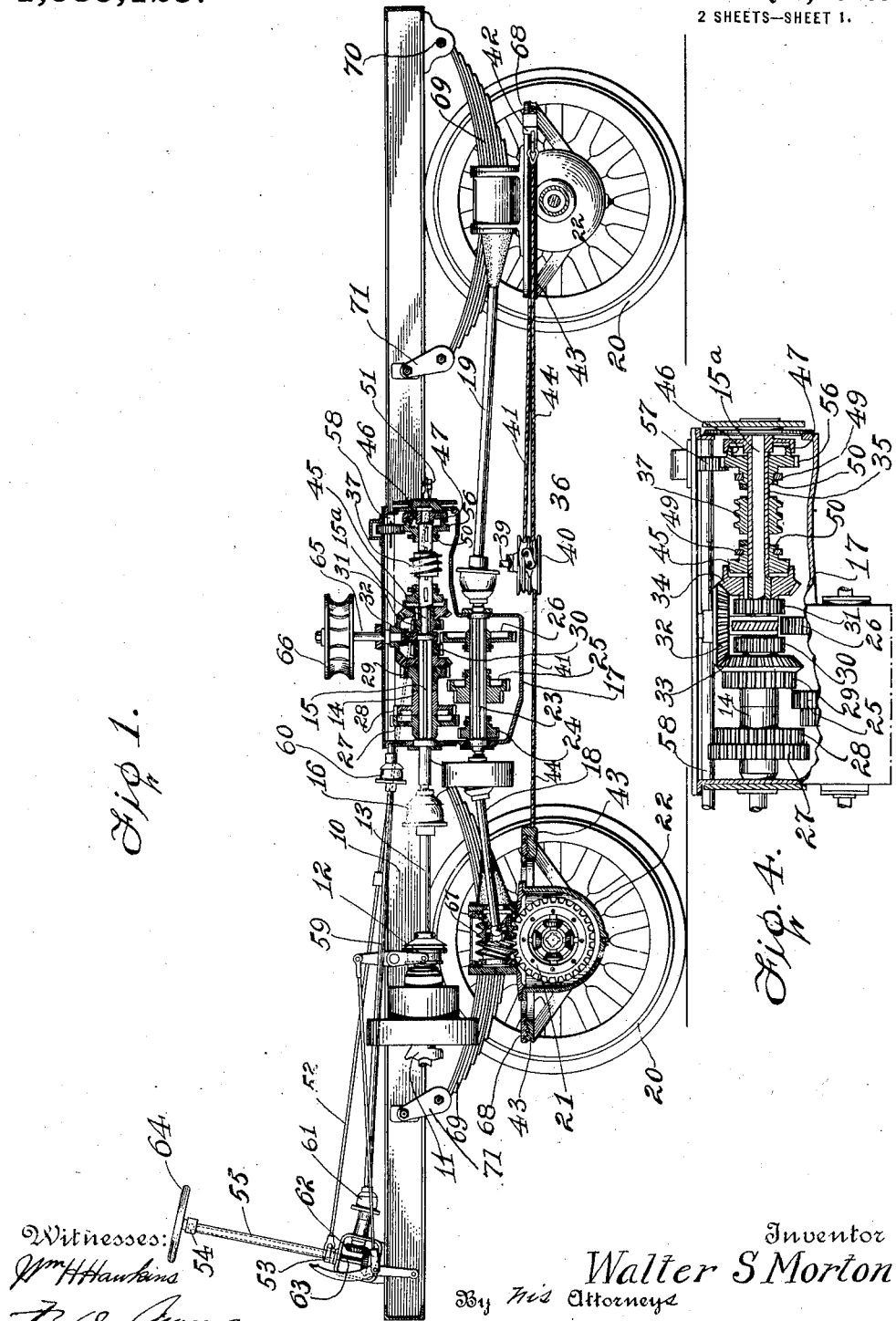

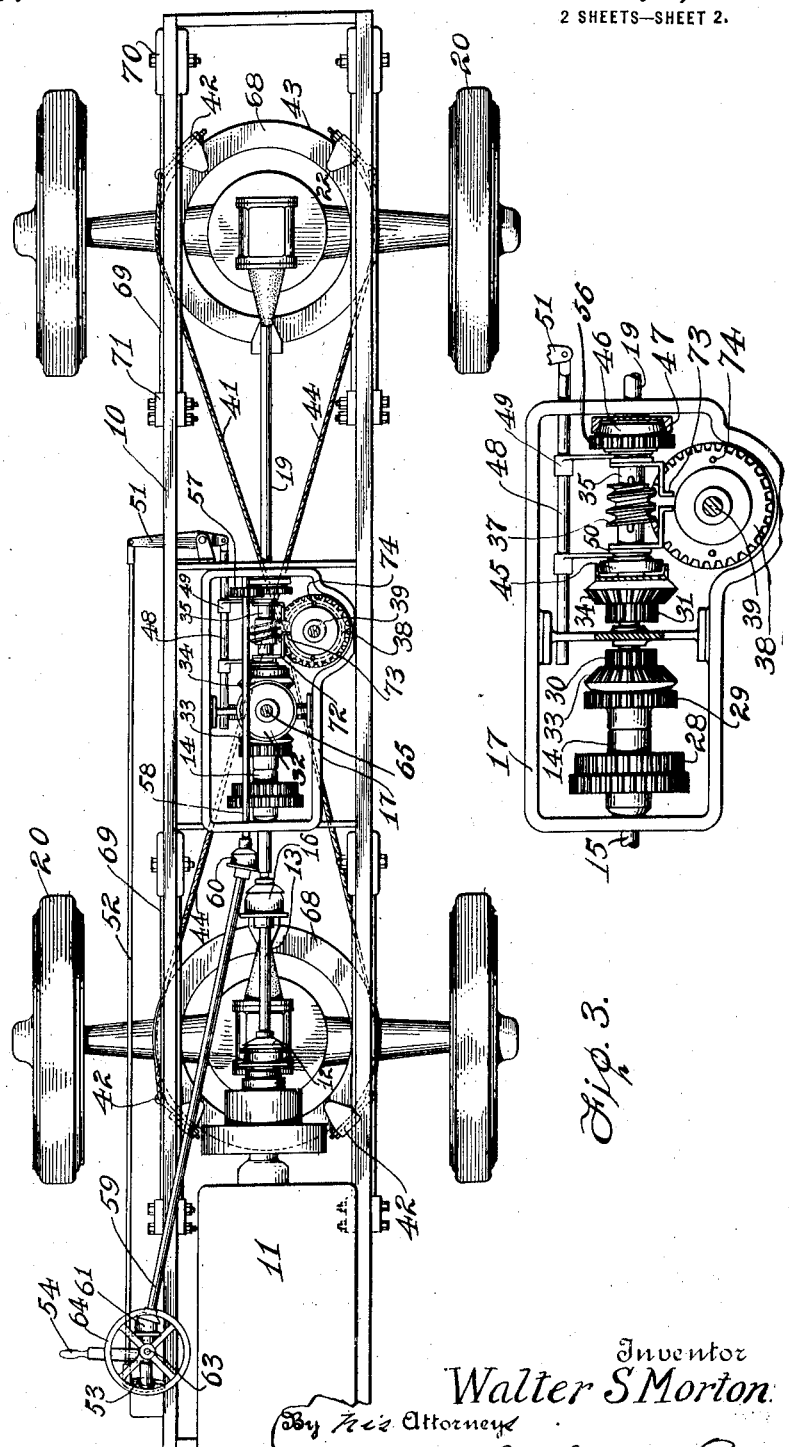

WALTER S. MORTON, OF HARRISBURG, PENNSYLVANIA.

STEERING MECHANISM FOR MOTOR-TRUCKS.

1,339,125.  Specification of Letters Patent.  Patented May 4, 1920.

Application filed October 30, 1915. Serial No. 58,825.

*To all whom it may concern:*

Be it known that I, WALTER S. MORTON, a citizen of the United States, residing at Harrisburg, in the county of Dauphin and State of Pennsylvania, have invented new and useful Improvements in Steering Mechanism for Motor-Trucks, of which the following is a specification.

This invention relates to motor-trucks, and particularly to trucks of heavy type which employ power actuated steering mechanisms.

A principal object of the invention is to produce steering mechanism for such a truck which can be readily operated instantly, either by hand or by power.

A further object of the invention is to produce a truck of the four-wheel drive type in which both of the axles are moved in steering though the driving connection to each wheel is constantly maintained.

A further object of the invention is to produce such a mechanism constructed so that at any time the truck can be steered at will by power or by hand without readjusting or removing any part.

A further object of the invention is to produce a very simple hand and power steering mechanism in which the hand steering wheel or lever is constantly maintained in connection with the steering mechanism.

A further object of the invention is to provide very simple means for adapting the transmission mechanism of the truck to enable the engine or motor on the truck to be used to exert a tractive effort or pull in a cable, the general purpose being to enlarge the useful functions of such a truck and to enable it to perform special functions, including that of dislodging the truck where it has become stalled.

Further objects of the invention will appear more fully hereinafter.

The invention consists in the general combination of parts and details, described herein, all of which contribute to produce an efficient steering mechanism for motor-trucks.

A preferred embodiment of the invention is described in the following specification, while the broad scope of the invention will be pointed out in the appended claims.

In the drawing,

Figure 1 is a longitudinal section through a truck embodying my invention, certain parts being broken away.

Fig. 2 is a plan of the truck shown in Fig. 1 with the cover of the transmission case removed and other parts broken away.

Fig. 3 is a plan upon an enlarged scale showing the transmission mechanism, and particularly illustrating features of the power steering mechanism.

Fig. 4 is a vertical section and elevation upon an enlarged scale illustrating details of the transmission mechanism, the general view of which is shown in Fig. 1.

The truck may comprise a frame 10 of any suitable construction which may be provided near its forward end with a motor 11 connected by a clutch 12 with a driving shaft 13 for driving the transmission mechanism 14 mounted in a suitable case 17 near the middle portion of the frame.

In embodying my invention in such a truck, I arrange the steering mechanism so that it has combined hand steering and power steering features, and the arrangement is such that a control member is provided to apply the power steering and another control member to apply the hand steering. At any moment, the driver at will may seize the hand steering controlling member or the power steering controlling member and fully control the truck, and this he can do without adjusting or disconnecting any part or making any change or adjustment whatever in the mechanism.

The transmission mechanism 14 comprises a driving shaft 15 which extends in a direction substantially parallel with the longitudinal axis of the truck frame. This shaft is continuously driven through a suitable coupling 16 from the driving shaft 13. The transmission mechanism includes mechanism for actuating driving shafts 18 and 19, which drive the wheels 20 through suitable differential mechanisms 21 disposed in the front and rear axles 22 respectively.

The transmission mechanism may be of any suitable construction capable of driving the wheels 20 so as to move the truck ahead or in a reverse direction, and the driven gears of the transmission mechanism are capable of assuming an intermediate or neutral position in which no power will be imparted to the wheels. Any suitable arrangement having this mode of operation may be adopted. In the present embodiment, however, I provide a countershaft 23 on which driven gear wheels 24, 25 and 26 are mounted and these gears are non-rotatable, but slidable on the shaft 23 so that they may be moved into mesh with corresponding gears 27, 28, 29 and 30 on the shaft 15. The gear wheels 30 and 26, when in mesh, will drive the truck at the slowest speed ahead.

In order to drive the truck in a reverse direction, I prefer to provide a reversing gear 31 which is similar to the pinion or gear 30, but which is driven in the opposite direction to the gear 30 through an idle beveled gear 32 meshing with a beveled gear 34, said beveled gears 33 and 34 being rigid respectively with the pinions 30 and 31. Inasmuch as the gears or pinions 30 and 31 are in axial alinement, it will be noted that the idle beveled gear 32 rotates in a plane substantially parallel with the axis of the shaft 15; though the pinion or gear 30 is rigid on shaft 15, the pinion 31 is loose on an extension 15$^a$ which extends rearwardly from and forms a part of the shaft 15. This extension shaft 15$^a$ plays an important part in the steering mechanism. Upon it there is a driving member for the steering gear in the form of a worm 37 carried rigidly on a sleeve 35, and this driving member affords means for driving the steering gear 36. Worm 37 meshes with the worm wheel 38, the spindle 39 of which extends downwardly and carries a small drum or pulley 40, to which a steering cable 41 is attached. The ends of the steering cable 41 are anchored as at 42 to fifth-wheel members 43 on the front and rear axles 22. When the drum 40 rotates, one side of the cable 41 is taken up and the other side paid out, which will put the axles in an inclined or steering position.

Crossing the cable 41 there is provided another cable 44 which simply connects the right side of one axle with the left side of the other, and this cable 44 is similarly attached to the fifth-wheels on the axles of the trucks.

Referring again to the driving member 37, its sleeve 35 carries two slidable splined clutch members 45 and 46. The face of beveled gear 34 is formed into a clutch member which coöperates with the movable clutch member 45, and on the end of extension shaft 15$^a$ there is provided another clutch member 47 which coöperates with clutch member 46. Means is provided for shifting the movable clutch members longitudinally on the sleeve 35 so that either the clutch member 45 or 46 may make a driving connection to the worm. Evidently, when the clutch formed of the clutch members 34 and 45 is closed, the worm 37 will be rotated in one direction, and when the clutch members 46 and 47 are closed together, the worm will rotate in the opposite direction.

In order to shift the clutch members 45 and 46 simultaneously, I prefer to provide a shift bar 48, see Fig. 2, which is guided to slide longitudinally, and this shift bar carries two shifter arms 49 with yokes which engage with grooved collars 50 on the clutch members 45 and 46. The end of the shift bar 48 is attached to a lever 51 and this lever is actuated by a long link 52, the forward end of which is attached to an arm 53 which is moved by hand steering controlling member or lever 54 which lever is attached to a tubular steering spindle 55. This steering spindle 55 is located near the forward end of the truck near the driver's seat.

In order to enable the truck to be steered by hand at any time, I prefer to provide a construction, in the operation of which a constant connection is maintained to the steering gear 36. For this purpose I prefer to provide means for rotating the worm 37 through sleeve 35 at any time by hand. This is most conveniently accomplished by forming gear teeth 56 on one of the clutch members, for example, the clutch member 46, so that this clutch member constitutes a gear wheel as well as a clutch member. Meshing with the teeth 56 I provide a widefaced gear wheel 57 which is rigidly attached to a suitable spindle 58 (see Fig. 2) rotatably mounted in the gear case. This spindle 58 may be rotated when desired by an inclined coupling rod or spindle 59 which may comprise flexible couplings 60 and 61 which connect it through the medium of beveled gears 62 with an inner spindle 63 which lies within the tubular spindle 55 and which carries a rigid hand steering controlling member or wheel 64.

A truck such as I describe will have its general utility greatly increased if it carries the improvement I am about to describe This improvement consists in a winch-drum or similar means arranged to be driven by the motor when desired. This effect is best accomplished by providing one of the gear wheels such as the idle gear 32 with a rigid shaft 65 which rotates when the gear is driven, and this shaft if desired may extend in a horizontal direction. In the present embodiment I have illustrated it extending in a substantially vertical direction (see Fig. 1). On this shaft there is mounted a removable winch-drum 66. With this arrangement evidently the driven gears 24, 25 and 26 of the transmission mechanism may be put in a neutral position such as that indicated in Fig. 1, and when this is done, the motor can exert all its energy in driving the shaft 65. If a cable is then wrapped upon the winch-drum 66, the full power of the engine can be exerted to drive the drum to develop tension in the cable. This arrangement is extremely useful, enabling the truck to be used to pull itself out of a bad road when it is stalled, and it also adapts the truck for pulling stumps or hauling logs or any other such work.

The differential gears 21 are preferably driven by means of worms 67 which have flexible driving connections on their interior with the ends of the driving shafts 18 and 19. The flexibility in these driving connections enables the wheels to be driven in any steering position the axles may assume.

The upper fifth-wheel members 68 are attached at the sides to the under sides of springs 69, preferably in the form of carriage springs. The corresponding ends of these springs are pivotally attached on pivot pins 70, and the other corresponding ends or forward ends are pivotally supported on movable shackle plates or shackles 71. I prefer to employ a spring suspension such as this because it does not subject the cables 41 and 44 to any undue tension when the truck is loaded. This fact will be understood from the following considerations. When a heavy load is placed on the truck frame, a flattening of the springs 69 occurs which tends to move both the axles 22 in a forward direction. This, of course, does not have the effect of increasing the tension in cable 44. However, as the drum 40 is relatively fixed, there occurs a slackening of the rear portion of the cable 41, and an increased tension is developed in the forward portion of the cable 41. This, of course, tends to give a slight steering movement to the axles, but this can be at once corrected, and the wheels straightened by a slight rotation of the spindle 39. This spindle 39, of course, can be rotated either by a movement of the hand steering wheel 64 or the power steering lever 54.

In case the operator of the car should apply the power steering gear and omit to throw it out when the axles have arrived at their maximum swing, I prefer to provide automatic means for effecting the throwing out of the power steering gear. For this purpose I prefer to provide the shifting arms 49 with extensions 72 that are bent outwardly to form toes 73, and these toes project in the path of oppositely disposed pins 74 which project up from the worm wheel 38. The direction of driving the worm wheel 38 is such that when the clutch at 46 is in, the adjacent pin 74 on the worm wheel will move toward the worm, and about the time that the axles have been given their maximum swing this pin will strike the adjacent toe 73 and throw open the clutch 46—47.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

What I claim is:

1. In a steering mechanism for vehicles, in combination, a power-driven shaft, a driving member driven by said shaft in one direction, another driving member driven by said shaft in the opposite direction, a driven member, hand-operated power-controlling means for moving said driven member from a neutral position into engagement with either of said driving members to be driven thereby, steering mechanism to control the wheels of the vehicle driven by said driven member, and hand steering means having a constant driving connection with said driven member for controlling the steering mechanism by hand when said driven member is in a neutral position out of engagement with both of said driving members.

2. In a steering mechanism for vehicles, in combination, a power-driven shaft, a driving member driven by said shaft in one direction, another driving member driven by said shaft in the opposite direction, a driven member, hand-operated power-controlling means for moving said driven member from a neutral position into engagement with either of said driving members to be driven thereby, steering mechanism to control the wheels of the vehicle driven by said driven member, hand steering means having a constant driving connection with said driven member for controlling the steering mechanism by hand when said driven member is in a neutral position out of engagement with both of said driving members, and automatic means for throwing out the power drive in the extreme positions of the steering mechanism.

3. In a steering mechanism for vehicles, in combination, a power driven shaft, a driving member driven by said shaft in one direction, another driving member driven by said shaft in the opposite direction, a driven member, a hand-operated power-controlling means for moving said driven member from a neutral position into engagement with either of said driving members to be driven thereby, hand steering means, said driven member including means having a constant driving connection with said hand steering means to enable the vehicle to be steered by said hand steering means when said driven member is in its neutral position, and steering mechanism driven by said driven member.

4. In a steering mechanism for vehicles, in combination, a power-driven shaft, a clutch member rigid therewith, a clutch member loose on said shaft, means for driving said shaft in one direction and said loose clutch member in the opposite direction, a movable member for actuating the steering mechanism, said member having two driven clutch members for respectively engaging said first named clutch members to drive said movable member in either direction, and means for shifting said driven clutch members to effect a driving connection with either of said first named clutch members.

5. In a steering mechanism for vehicles, in combination, a power-driven shaft, a clutch member rigid therewith and a clutch member loose on said shaft, means for driving said shaft in one direction and said loose clutch member in the opposite direction, a driving member for the steering mechanism, a hand steering controlling member constantly connected with said driving member to rotate the same for hand steering, said driving member having two movable clutch members for respectively engaging said first named clutch members to drive said driving member in either direction by power, and means adjacent to said hand steering wheel for shifting said movable clutch members to effect engagement with either of said first named clutch members.

6. In a motor-truck, in combination, a frame, a motor mounted thereupon, transmission mechanism for driving the truck, power steering means actuated by said transmission mechanism, a shaft extending from the said transmission mechanism in a direction substantially at right angles to the longitudinal axis of the frame of the truck, and a winch-drum carried by said last named shaft for winding up a cable to exert tension therein.

7. In a motor-truck, in combination, a frame, a motor mounted thereupon, transmission mechanism for driving the truck, power steering means actuated by said transmission mechanism, a shaft extending from the said transmission mechanism in a direction substantially at right angles to the longitudinal axis of the frame of the truck, and driven by one of the gears of said transmission mechanism, and a winch-drum carried by said last named shaft for winding up a cable to exert tension therein.

8. In a truck, in combination, transmission mechanism having a shaft, a gear driven by said shaft for driving the vehicle in one direction, a reversing gear for driving the vehicle in the opposite direction, a gear wheel meshing with said reversing gear for imparting movement thereto from said shaft, said last named gear having a rotatable shaft extending from the transmission mechanism, and means carried by said last named shaft for winding a cable thereupon to exert a pull in the cable.

9. In a truck, in combination, a frame, a motor mounted on said frame, transmission mechanism driven by said motor for driving the wheels of the truck, and including driven gears, means for holding said driven gears in a neutral position to disconnect the drive to the wheels of the truck, steering gear driven by said transmission mechanism and a shaft extending from said transmission mechanism driven by one of the gears of said transmission mechanism, and a winch-drum carried by said last named shaft for exerting a pull in a cable.

10. In a truck, in combination, a frame, a motor mounted on said frame, transmission mechanism driven by said motor and including driven gears for driving the wheels of the truck, means for holding said driven gears in a neutral position to disconnect the drive to the wheels of the truck, said transmission mechanism including a shaft extending longitudinally of said frame, gears on said shaft and including a gear wheel disposed in a plane substantially parallel with the axis of said shaft, said last named gear wheel having a shaft extending from the transmission mechanism, and a winch-drum carried by said last named shaft for exerting a pull in a cable.

11. In a steering apparatus for a vehicle, in combination, steering mechanism, power devices for operating the steering mechanism, manually operative means entering into the power devices and in connection with the steering mechanism for steering the vehicle by hand power while the power steering devices are inactive, and means for automatically effecting the throwing out of the power devices for the steering mechanism at pre-determined times.

12. A motor vehicle of the four-wheel drive type, embodying a frame and transmission mechanism, a pair of wheel axles each mounted to swing in a substantially horizontal plane about a fixed axis for steering, a motor, a driving gear connection between the transmission mechanism and each axle, steering means for simultaneously imparting a substantially horizontal swinging movement to both axles in steering, power mechanism actuated through the transmission mechanism for actuating said steering means, and a manually operable controller for throwing the power mechanism into and out of operation.

13. A motor vehicle of the four-wheel drive type, embodying a frame and transmission mechanism, a pair of wheel axles each mounted to swing in a substantially horizontal plane about a fixed axis for steering, a motor, a driving gear connection between the transmission mechanism and each axle, steering means for simultaneously imparting a substantially horizontal swinging movement to both axles in steering, power mechanism actuated through the transmission mechanism for actuating said steering means to steer the vehicle toward the right or toward the left, and a manually operable controller for throwing the power mechanism into and out of operation.

14. A motor vehicle of the four-wheel drive type, embodying a frame and transmission mechanism, a pair of wheel axles each mounted to swing in a substantially horizontal plane about a fixed axis for steering, a motor, a member driven by said transmission mechanism in one direction, another member driven by said transmission mechanism in the opposite direction, steering means for simultaneously imparting a substantially horizontal swinging movement to both axles in steering, power mechanism actuated through either of said members for actuating said steering means, and a manually operable controller for throwing the power mechanism into and out of connection with either of said members to steer the vehicle in either direction.

15. In steering apparatus for vehicles and in combination, steering mechanism, manually operable means directly connected to said steering mechanism, said means including complemental gear elements, and means for operatively connecting the vehicle power within the manual steering connections at will, said connections including an element shiftable longitudinally to control the direction of steering under power operation and carrying one of said gear elements.

In testimony whereof I have hereunto set my hand in presence of two subscribing witnesses.

WALTER S. MORTON.

Witnesses:
A. I. WHALEN,
ROBT. L. MORTON.